US012123587B2

(12) United States Patent
Kim et al.

(10) Patent No.: US 12,123,587 B2
(45) Date of Patent: Oct. 22, 2024

(54) SPEAKER ASSEMBLY

(71) Applicant: LG ELECTRONICS INC., Seoul (KR)

(72) Inventors: Kihun Kim, Seoul (KR); Jongwoo Kim, Seoul (KR); Seunghark Paek, Seoul (KR); Heuisik Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/287,633

(22) PCT Filed: Feb. 7, 2022

(86) PCT No.: PCT/KR2022/001797
§ 371 (c)(1),
(2) Date: Oct. 19, 2023

(87) PCT Pub. No.: WO2022/225151
PCT Pub. Date: Oct. 27, 2022

(65) Prior Publication Data

US 2024/0183525 A1 Jun. 6, 2024

(30) Foreign Application Priority Data

Apr. 20, 2021 (KR) ........................ 10-2021-0050793

(51) Int. Cl.

| | |
|---|---|
| ***F21V 33/00*** | (2006.01) |
| ***F21V 3/04*** | (2018.01) |
| ***F21V 11/16*** | (2006.01) |
| ***H04R 1/02*** | (2006.01) |
| ***H04R 1/34*** | (2006.01) |

(52) U.S. Cl.
CPC .......... *F21V 33/0056* (2013.01); *F21V 3/049* (2013.01); *F21V 11/16* (2013.01); *H04R 1/028* (2013.01); *H04R 1/345* (2013.01); *H04R 2201/34* (2013.01)

(58) Field of Classification Search
CPC ..... H04R 2201/34; F21V 11/16; F21V 3/048; F21V 33/0056
See application file for complete search history.

(56) References Cited

U.S. PATENT DOCUMENTS

2009/0207607 A1* 8/2009 Haase ...................... G08B 7/06
362/86

FOREIGN PATENT DOCUMENTS

CN 115342319 A * 11/2022
JP 2004007308 A * 1/2004
(Continued)

OTHER PUBLICATIONS

Innovation Q+ NPL Search (Year: 2024).*

*Primary Examiner* — Anabel Ton
(74) *Attorney, Agent, or Firm* — Birch, Stewart, Kolasch & Birch, LLP

(57) ABSTRACT

A speaker assembly is disclosed. The speaker assembly includes: a speaker configured to provide sound in a first direction; a light-transmitting plate spaced apart from the speaker in the first direction and facing the speaker, the light-transmitting plate being configured to reflect the sound in a second direction that is different from the first direction; and an optical assembly disposed opposite the speaker with respect to the light-transmitting plate, the optical assembly being configured to provide light to the light-transmitting plate.

10 Claims, 11 Drawing Sheets

(56) References Cited

FOREIGN PATENT DOCUMENTS

| | | | | | |
|---|---|---|---|---|---|
| JP | 2006-148503 | A | | 6/2006 | |
| JP | 2008-252610 | A | | 10/2008 | |
| KR | 20-0195710 | Y1 | | 9/2000 | |
| KR | 20090002534 | U | * | 3/2009 | |
| KR | 10-2014-0089286 | A | | 7/2014 | |
| KR | 10-2081758 | B1 | | 2/2020 | |
| KR | 20220009779 | A | * | 1/2022 | |
| WO | WO-2019013216 | A1 | * | 1/2019 | .......... F21V 33/0056 |

* cited by examiner

SPEAKER ASSEMBLY

CROSS REFERENCE TO RELATED APPLICATIONS

This application is the National Phase of PCT International Application No. PCT/KR2022/001797, filed on Feb. 7, 2022, which claims priority under 35 U.S.C. 119(a) to Patent Application No. 10-2021-0050793, filed in the Republic of Korea on Apr. 20, 2021, all of which are hereby expressly incorporated by reference into the present application.

TECHNICAL FIELD

The present disclosure relates to a speaker assembly.

BACKGROUND ART

A speaker is a transducer that converts an electrical audio signal into a sound wave, and can be used alone or connected to various devices such as a display device and an electronic device. Such a speaker may be subdivided into a woofer, a mid-range, and a tweeter according to frequency ranges.

A compression driver may be installed in a speaker enclosure to generate sound. The sound generated by the compression driver may be output to the outside through a speaker hole formed in the enclosure.

Recently, a lot of research has been conducted on providing a certain quality of sound regardless of the listener's position relative to the speaker. In addition, various research has been carried out on the application of a lighting device to speakers for achieving various lighting effects.

DISCLOSURE

Technical Problem

It is an objective of the present disclosure to solve the above and other problems.

It is another objective of the present disclosure to provide a speaker assembly that can provide sound and lighting.

It is yet another objective of the present disclosure to provide a speaker assembly that can provide sound and lighting omnidirectionally in a horizontal direction.

It is yet another objective of the present disclosure to optimally design the position of a light-transmitting plate relative to a speaker that outputs sound in consideration of acoustic characteristics.

It is yet another objective of the present disclosure to provide a speaker assembly that can achieve various lighting effects.

Technical Solution

According to an aspect of the subject matter described in this application, a speaker assembly includes: a speaker configured to provide sound in a first direction; a light-transmitting plate spaced apart from the speaker in the first direction and facing the speaker, the light-transmitting plate being configured to reflect the sound in a second direction that is different from the first direction; and an optical assembly disposed opposite the speaker with respect to the light-transmitting plate, the optical assembly being configured to provide light to the light-transmitting plate.

Advantageous Effects

A speaker assembly according to the present disclosure has the following effects.

According to at least one of the embodiments of the present disclosure, it is possible to provide a speaker assembly capable of providing sound and lighting.

According to at least one of the embodiments of the present disclosure, it is possible to provide a speaker assembly capable of providing sound and lighting omnidirectionally in a horizontal direction.

According to at least one of the embodiments of the present disclosure, it is possible to provide an optimally design for the position of a light-transmitting plate relative to a speaker that outputs sound in consideration of acoustic characteristics.

According to at least one of the embodiments of the present disclosure, it is possible to provide a speaker assembly capable of achieving various lighting effects.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

MODE FOR THE INVENTION

Figure 1:
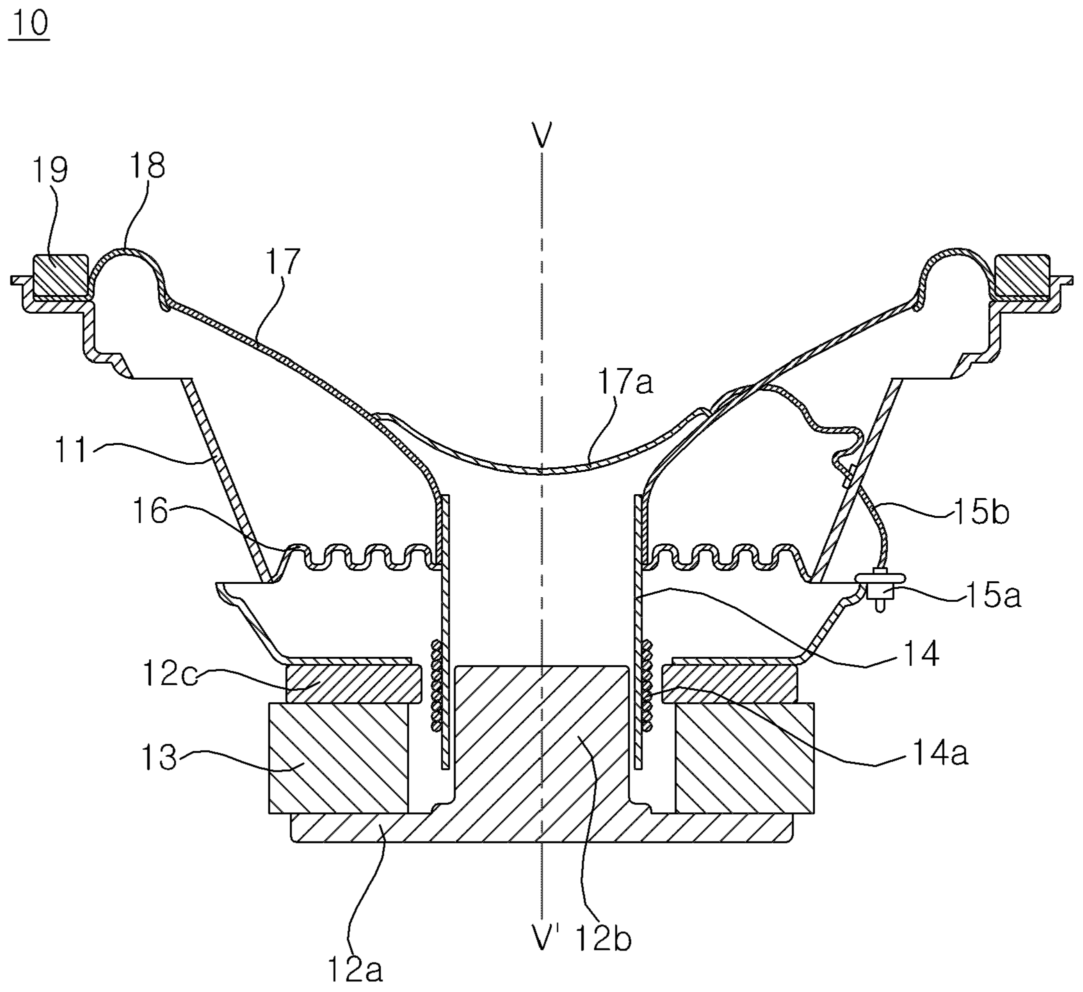
FIGS. 1 to 11 illustrate examples of a speaker assembly according to embodiments of the present disclosure.

Description will now be given in detail according to exemplary embodiments disclosed herein, with reference to the accompanying drawings. For the sake of brief description with reference to the drawings, the same or equivalent components are provided with the same or similar reference numerals, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

In the following description, if an embodiment is described with reference to a specific figure, reference numeral not shown in the specific figure may be mentioned, if necessary or desired. However, the reference numeral not shown in the specific figure may be mentioned only when the reference numeral is shown in other figures.

The directions "up (U)", "down (D)", "left (Le)", "right (Ri)", "front (F)", and "rear (R)" shown in the drawings are only for the convenience of description, and the technical concept disclosed in the specification is not limited by these directions.

Referring to FIG. 1, the components of a speaker 10 may be arranged with respect to a vertical line VV' parallel to an up-and-down or vertical direction. Meanwhile, the speaker 10 may be referred to as an active speaker, an active loudspeaker, or an active driver.

A frame 11 may define an outer appearance of the speaker 10. The frame 11 may define a space in which components of the speaker 10 described later are installed. At least some of the components of the speaker 10 including the frame 11 may be disposed in the inner space of a first housing 20 (see FIG. 2), which will be described later.

A bottom plate 12*a* may define a lower side or bottom of the speaker 10. A pole piece 12*b* may protrude upward from a central portion of the bottom plate 12*a*, and may be configured as a solid cylinder. A top plate 12*c* may be spaced upward from the bottom plate 12*a*, and may have a ring shape to allow a portion of the pole piece 12*b* to pass therethrough. Here, an air gap (no reference numeral) may be formed between the top plate 12*c* and the pole piece 12*b*.

A magnet 13 may be disposed between the bottom plate 12*a* and the top plate 12*c*, and may have a ring shape to allow a portion of the pole piece 12*b* to pass therethrough. A bobbin 14 may be installed in the air gap, and may have a coil 14*a* wound thereon. Here, an input terminal 15*a* and a tinsel wire 15*b* may transmit electric energy output from an amplifier (not shown) to the coil 14*a*. In addition, a spider 16 having elasticity may be coupled to the bobbin 14 and the frame 11 between the bobbin 14 and the frame 11, thereby supporting the bobbin 14. Meanwhile, the spider 16 may be referred to as a damper.

One side of a diaphragm 17 may be coupled or attached to the bobbin 14, and the other side of the diaphragm 17 may be supported by an edge 18 having elasticity. For example, the diaphragm 17 may have a cone or dome shape. In this case, a gasket 19 may be provided on a side surface of the edge 18 to prevent the interference of a surrounding mechanism with the diaphragm 17. In addition, a dust cap 17*a* may cover a central portion of the diaphragm 17 to thereby prevent the inflow of dust into a magnetic circuit.

Accordingly, a magnetic line of force by the magnet 13 may be formed in the air gap, and when current flows through the coil 14*a*, a Lorentz force may be generated. The magnitude of the Lorentz force may be proportional to the magnitude of the magnetic line of force (magnetic flux density), the amount of current, and the length of the wound coil, and the direction of the force may be in a direction perpendicular to a plane formed by the magnetic flux density and the current. That is, the diaphragm 17 may vibrate in a direction toward one side or the other side of the speaker 10, namely, in the vertical direction. Here, when the diaphragm 17 moves toward the upper side or top of the speaker 10, a positive (+) sound pressure may be generated, and when the diaphragm 17 moves toward the lower side or bottom of the speaker 10, a negative (−) sound pressure may be generated, allowing the speaker 10 to provide sound upward thereof. Further, according to the vibration of the diaphragm 17, air present in the inner space of the first housing 20 (see FIG. 2) also resonates to thereby cause a change in the pressure thereof.

Figure 2:
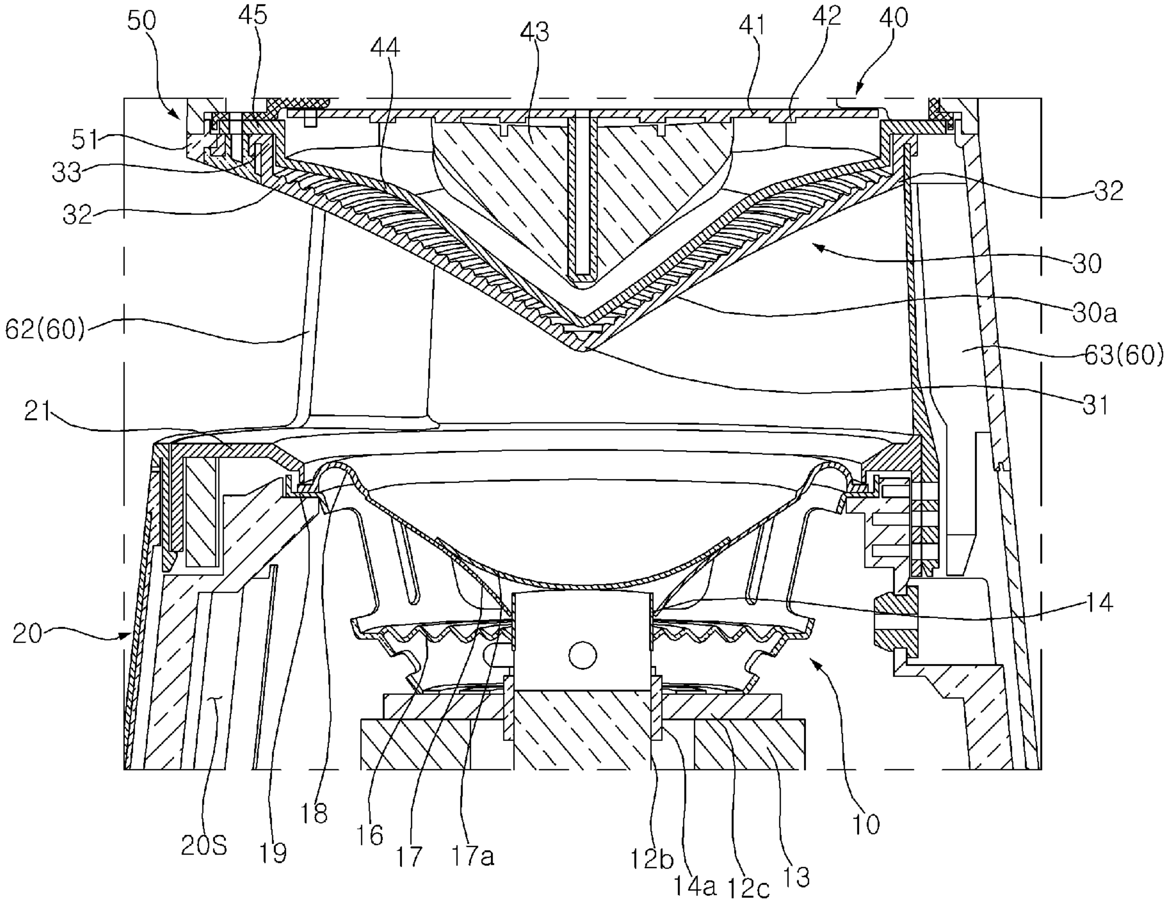

Referring to FIG. 2, the first housing 20 may provide an inner space 20S in which the speaker 10 described above is installed. For example, the first housing 20 may have a cylindrical shape or a truncated cone shape. Meanwhile, the first housing 20 may be referred to as a lower housing or an enclosure.

A first part 21 may be provided on an upper side of the first housing 20. The first part 21 may be formed in a ring shape, and may have a first hole formed through the first part 21 in the vertical direction. For example, a center of the first hole may be located on the vertical line VV' (see FIG. 1). Meanwhile, the first part 21 may be referred to as a lower part.

An inner end of the first part 21 may be coupled or fixed to the gasket 19, and may be spaced apart from the edge 18. Here, a portion of the speaker 10 may be inserted into the first hole. That is, a portion of the diaphragm 17, the dust cap 17*a*, and the edge 18 may be exposed to an outside of the first housing 20. For example, the first part 21 may have a flat upper side or top.

A light-transmitting plate 30 may be positioned above the speaker 10. The light-transmitting plate 30 may cover the diaphragm 17 from above the speaker 10. For example, a center of the light-transmitting plate 30 may be located on the vertical line VV' (see FIG. 1). In other words, the light-transmitting plate 30 and the speaker 10 may be aligned with each other with respect to the vertical line VV'. Meanwhile, the light-transmitting plate 30 may be referred to as a phase plug.

The light-transmitting plate 30 may be convex or pointed toward a center of the speaker 10. For example, the light-transmitting plate 30 may have a funnel or inverse-cone shape.

Also, the light-transmitting plate 30 may be larger in size than the first hole in a horizontal direction. The light-transmitting plate 30 may be formed of a material capable of reflecting sound. For example, the light-transmitting plate 30 may include a plastic or polymethyl methacrylate (PMMA) material. Accordingly, the light-transmitting plate 30 may guide sound provided in a first direction from the diaphragm 17 to a second direction that is different from the first direction. For example, the second direction may intersect the first direction. Meanwhile, the light-transmitting plate 30 may be referred to as a reflector plate 30.

A second housing 50 may be positioned above the first housing 20. The light-transmitting plate 30 may be coupled or fixed to an inside of the second housing 50. For example, the second housing 50 may have a cylindrical shape or a truncated cone shape. Meanwhile, the second housing 50 may be referred to as an upper housing.

A second part 51 may be provided on a lower side of the second housing 50. The second part 51 may be formed in a ring shape, and may surround the upper periphery of the light-transmitting plate 30. A lower surface of the second part 51 may be smoothly connected to a lateral surface 30*a* of the light-transmitting plate 30. That is, since the lower surface of the second part 51 extends along the lateral surface 30*a* of the light-transmitting plate 30, it may be considered as a part of the lateral surface of the light-transmitting plate 30. Meanwhile, a coupling portion 33 may protrude upward from an upper end 32 of the light-transmitting plate 30 so as to be coupled or fixed to an inside of the second part 51.

Columns 60 may be coupled to the first housing 20 and the second housing 50 between the first housing 20 and the second housing 50. For example, a lower end of the column 60 may be coupled to the first part 21, and an upper end of the column 60 may be coupled to the second part 51. The columns 60 may be spaced apart from each other along a circumferential direction of the first part 21 or the second part 51. Accordingly, the columns 60 may support the second housing 50 to thereby fix the position of the second housing 50 relative to the first housing 20. In addition, sound generated from the speaker 10 may pass through a space between the first housing 20 and the second housing 50.

Figure 3:
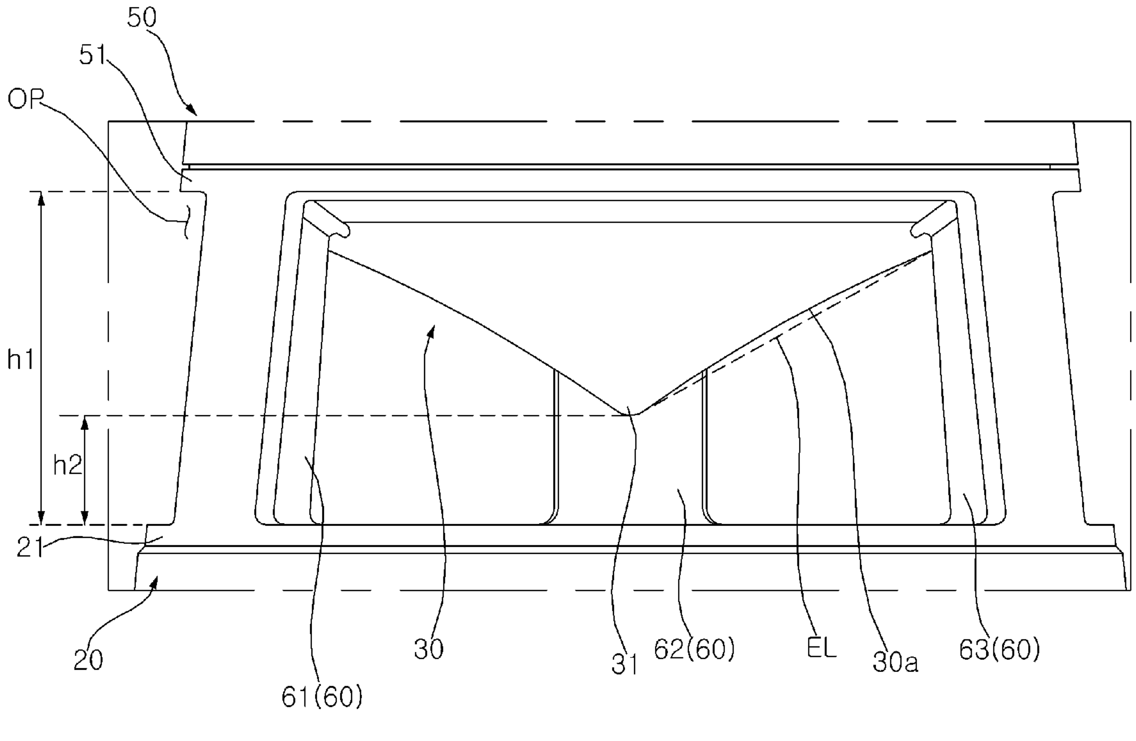

Referring to FIGS. 2 and 3, a central axis of the light-transmitting plate 30 may coincide with the vertical line VV'. The light-transmitting plate 30 may be disposed inside the columns 60.

A lower end 31 of the light-transmitting plate 30 may define a vertex of the light-transmitting plate 30, and may be located on the vertical line VV'. The lower end 31 of the light-transmitting plate 30 may be rounded or pointed toward the center of the speaker 10. Meanwhile, the lower end 31 of the light-transmitting plate 30 may be referred to as a vertex or center of the light-transmitting plate 30.

The upper end 32 of the light-transmitting plate 30 may define the upper periphery of the light-transmitting plate 30, and may extend while forming a circle or an ellipse with respect to the vertical line VV'. The columns 60 may be disposed along the periphery of the upper end 32 of the light-transmitting plate 30. The upper end 32 of the light-transmitting plate 30 may be referred to as a directrix.

The lateral surface 30*a* of the light-transmitting plate 30 may be a surface that connects the lower end 31 and the upper end 32 of the light-transmitting plate 30. The lateral surface 30*a* of the light-transmitting plate 30 may be a set of generators that connect the lower end 31 and the upper end 32 of the light-transmitting plate 30. The lateral surface 30*a* of the light-transmitting plate 30 may have a diameter that decreases from top to bottom. In other words, the lateral surface 30*a* of the light-transmitting plate 30 may be inclined upward by a predetermined angle (acute angle) with respect to a horizontal plane. Meanwhile, the lateral surface 30*a* of the light-transmitting plate 30 may be referred to as a compression surface or a reflective surface.

For example, the lateral surface 30*a* of the light-transmitting plate 30 may be parallel to an imaginary straight line EL that connects the lower end 31 and the upper end 32 of the light-transmitting plate 30. As another example, the lateral surface 30*a* of the light-transmitting plate 30 may be curved toward an inside of the light-transmitting plate 30 with respect to an imaginary straight line EL that connects the lower end 31 and the upper end 32 of the light-transmitting plate 30. In this case, a distance between an imaginary horizontal plane that extends along the upper side of the first part 21 and the light-transmitting plate 30 may be minimum at the lower end 31 of the light-transmitting plate 30, and may increase from the lower end 31 of the light-transmitting plate 30 toward the upper end 32 of the light-transmitting plate 30 or an end of the second part 51.

An opening OP may be an outlet of a space formed between the light-transmitting plate 30 and the speaker 10, and may be formed between an end of the first part 21 and the end of the second part 51. In other words, the opening OP may be formed along the lateral periphery of a speaker assembly.

Accordingly, sound generated from the speaker 10 may be guided to the opening OP by the light-transmitting plate 30, and the speaker assembly may have an omnidirectional characteristic capable of outputting sound at 360 degrees in the horizontal direction.

A reference height h1 may be the height of the opening OP, and may be a vertical distance between the first part 21 and the second part 51. A vertex height h2 may be the height of the lower end 31 of the light-transmitting plate 30 relative to the first part 21. Here, the lower end 31 of the light-transmitting plate 30 may be spaced upward from the diaphragm 17 or the dust cap 17*a*. The vertex height h2 may be greater than 0 (zero). The vertex height h2 may be 0 or may be less than 0.

When the vertex height h2 exceeds a predetermined ratio of the reference height h1, the reflection or guide of sound by the light-transmitting plate 30 described above may become difficult, which may cause a degradation in frequency response characteristic of the sound output from the speaker assembly by the light-transmitting plate 30. That is, the vertex height h2 may preferably be less than or equal to the predetermined ratio of the reference height h1. For example, the vertex height h2 may be ⅔ or less of the reference height h1. That is, when the reference height h1 is 66.5 mm, the vertex height h2 may be 44.3 mm or less. For example, the vertex height h2 may be 22.0 mm.

Thus, the light-transmitting plate 30 may guide sound generated from the speaker 10 in the horizontal direction while minimizing a degradation in frequency response characteristic of the sound.

Figure 4:
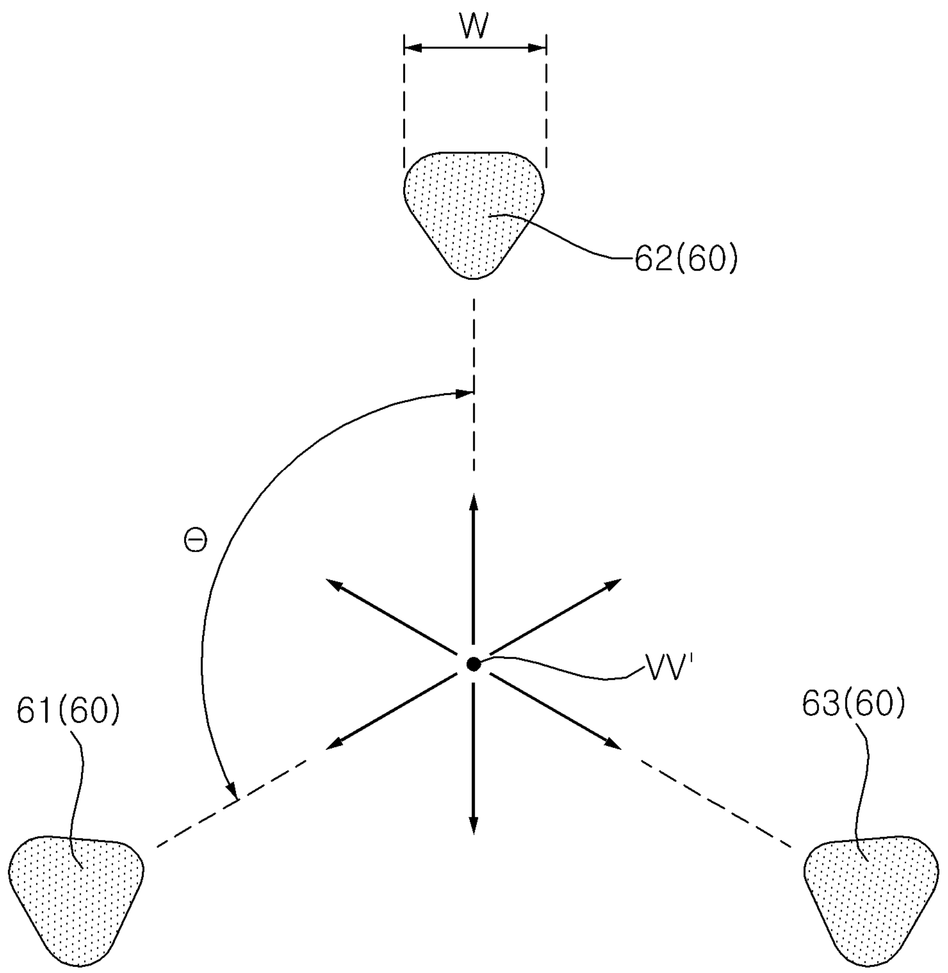

Referring to FIGS. 3 and 4, the columns 60 may be spaced apart from each other along the circumferential direction of the first part 21 or the second part 51. For example, an angle theta between the columns 60 may be substantially equal. For example, the first column 61, the second column 62, and the third column 63 may be arranged at intervals of 60 degrees in the circumferential direction of the first part 21 or the second part 51. For example, the columns 60 may have substantially the same shape.

An outer surface of the column 60 may be smoothly connected to an outer surface of the first part 21 and an outer surface of the second part 51. An inner surface of the column 60 may be configured as a curved surface. A width W of the cross section of the column 60 may decrease toward the vertical line VV'. Consequently, a degradation in acoustic characteristic due to the column 60 may be minimized.

Figure 5:
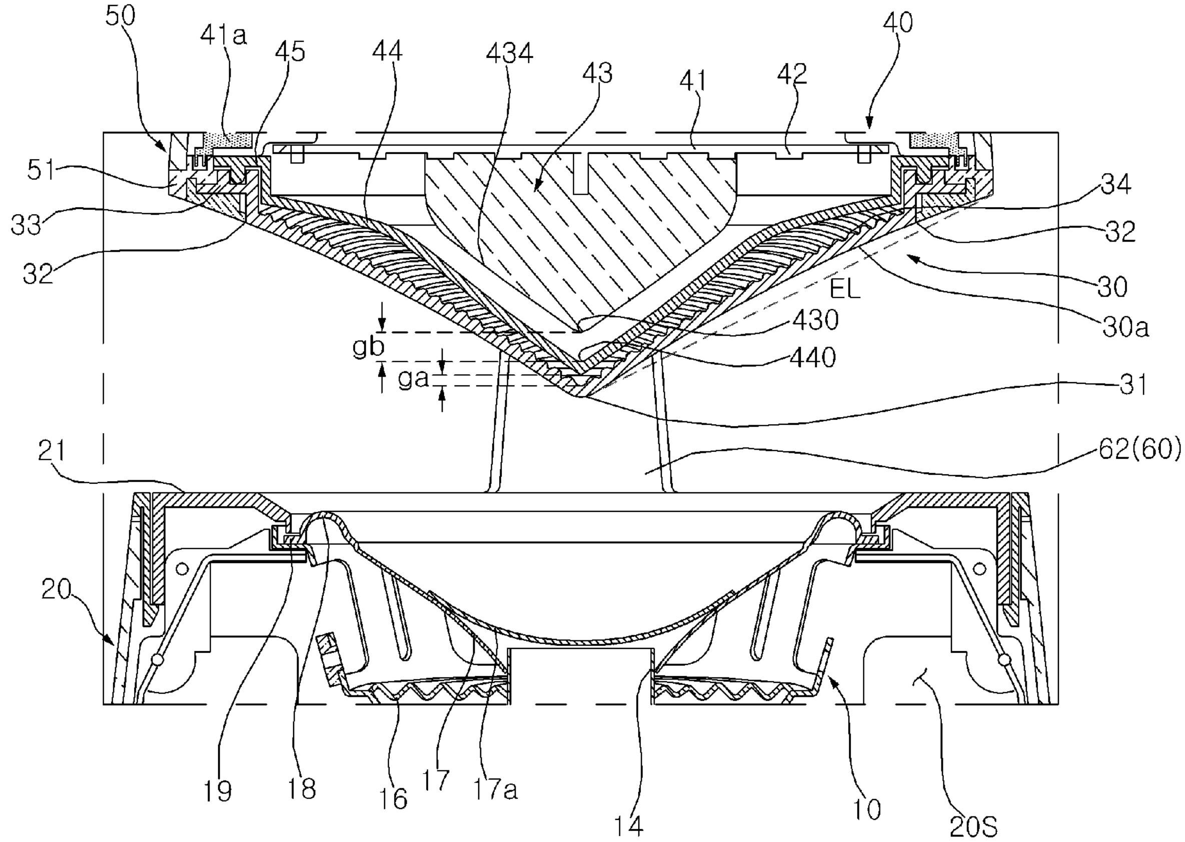

Referring to FIG. 5, an optical assembly 40 may be positioned above the light-transmitting plate 30. The optical assembly 40 may be coupled or fixed to the second housing 50 from above the light-transmitting plate 30. For example, a center of the optical assembly 40 may be located on the vertical line VV' (see FIG. 1). In other words, the optical assembly 40 and the light-transmitting plate 30 may be aligned with each other with respect to the vertical line VV'. The optical assembly 40 may include a substrate 41, a light source 42, a separation plate 43, and a diffusion plate 44.

The substrate 41 may define an upper side of the optical assembly 40. The substrate 41 may be formed flat with respect to a horizontal plane. The substrate 41 may be coupled or fixed to the inside of the second housing 50 via a mount 41*a* provided on one side of the substrate 41.

The substrate 41 may be a printed circuit board (PCB). The substrate 41 may be made of at least one of polyethylene terephthalate (PET), glass, polycarbonate (PC), and silicon. An electrode pattern may be formed on the substrate 41 to connect an adapter and the light source 42. For example, the electrode pattern may be a carbon nanotube electrode pattern.

The light source 42 may be mounted on a bottom of the substrate 41. The light source 42 may be a light emitting diode (LED) chip or an LED package. The light source 42 may be a colored LED that emits light of at least one of red, green, and blue, or a white LED. The colored LED may include at least one of a red LED, a green LED, and a blue LED. For example, the light source 42 may be a Chip On Board (COB) type. The COB type, which is a type in which the light source 42 is directly coupled to the substrate 41, may simplify the manufacturing process, and may lower resistance to thereby reduce energy loss. Further, the COB type may be advantageous to increase brightness and achieve a thin and lightweight profile.

The separation plate 43 may be coupled to the bottom of the substrate 41. The separation plate 43 may be spaced apart from the light source 42 at the bottom of the substrate 41. For example, a center 430 of the separation plate 43 may be located on the vertical line VV' (see FIG. 1). In other words, the separation plate 43 and the light-transmitting plate 30 may be aligned with each other with respect to the vertical line VV'.

The diffusion plate 44 may define a lower side of the optical assembly 40. The diffusion plate 44 may be coupled or fixed to the inside of the second housing 50 via a fixing part 45 provided on the periphery of the diffusion plate 44. For example, the fixing part 45 may be engaged with an upper side of the coupling portion 33, the coupling portion 33 may be fixed to the second part 51, and the second part 51 may be coupled to the lower side of the second housing 50.

The diffusion plate 44 may be positioned below the separation plate 43. In other words, the diffusion plate 44 may cover lower sides of the substrate 41, the light source 42, and the separation plate 43. For example, a center 440 of the diffusion plate 44 may be located on the vertical line VV' (see FIG. 1). In other words, the diffusion plate 44 and the light-transmitting plate 30 may be aligned with each other with respect to the vertical line VV'. The center 440 of the diffusion plate 44 may be a lower end of the diffusion plate 44.

The diffusion plate 44 may be formed of a material capable of diffusing light. That is, point emission of the light source 42 may be expanded to surface emission by the diffusion plate 44. The diffusion plate 44 may have a shape substantially the same as that of the transparent plate 30. That is, the diffusion plate 44 may be convex or pointed toward the center of the speaker 10. Accordingly, light diffused by the diffusion plate 44 may be evenly transmitted to the light-transmitting plate 30.

The light-transmitting plate 30 may be formed of a light-transmissive material. The light-transmitting plate 30 may be transparent or translucent. Accordingly, light provided from the light source 42 may be diffused by the diffusion plate 44 and then be projected to the outside through the light-transmitting plate 30. That is, to correspond to the speaker assembly outputting sound at 360 degrees in the horizontal direction, light may also be spread at 360 degrees in the horizontal direction.

Meanwhile, the diffusion plate 44 may be spaced downward from the substrate 41 and the separation plate 43. The center 440 of the diffusion plate 44 may be spaced downward from the center 430 of the separation plate 43 by a second distance gb. An air gap may be formed between the substrate 41 or the separation plate 43 and the diffusion plate 44. Accordingly, light provided from the light source 42 may be widely spread by the air gap that functions as a buffer.

Meanwhile, the light-transmitting plate 30 may be spaced downward from the diffusion plate 44. The center 440 of the diffusion plate 44 may be spaced upward from the center 31 of the light-transmitting plate 30 by a first distance g1. Thus, the generation of vibration or acoustic noise due to contact between the light-transmitting plate 30 and the diffusion plate 44 may be minimized.

Figure 6:
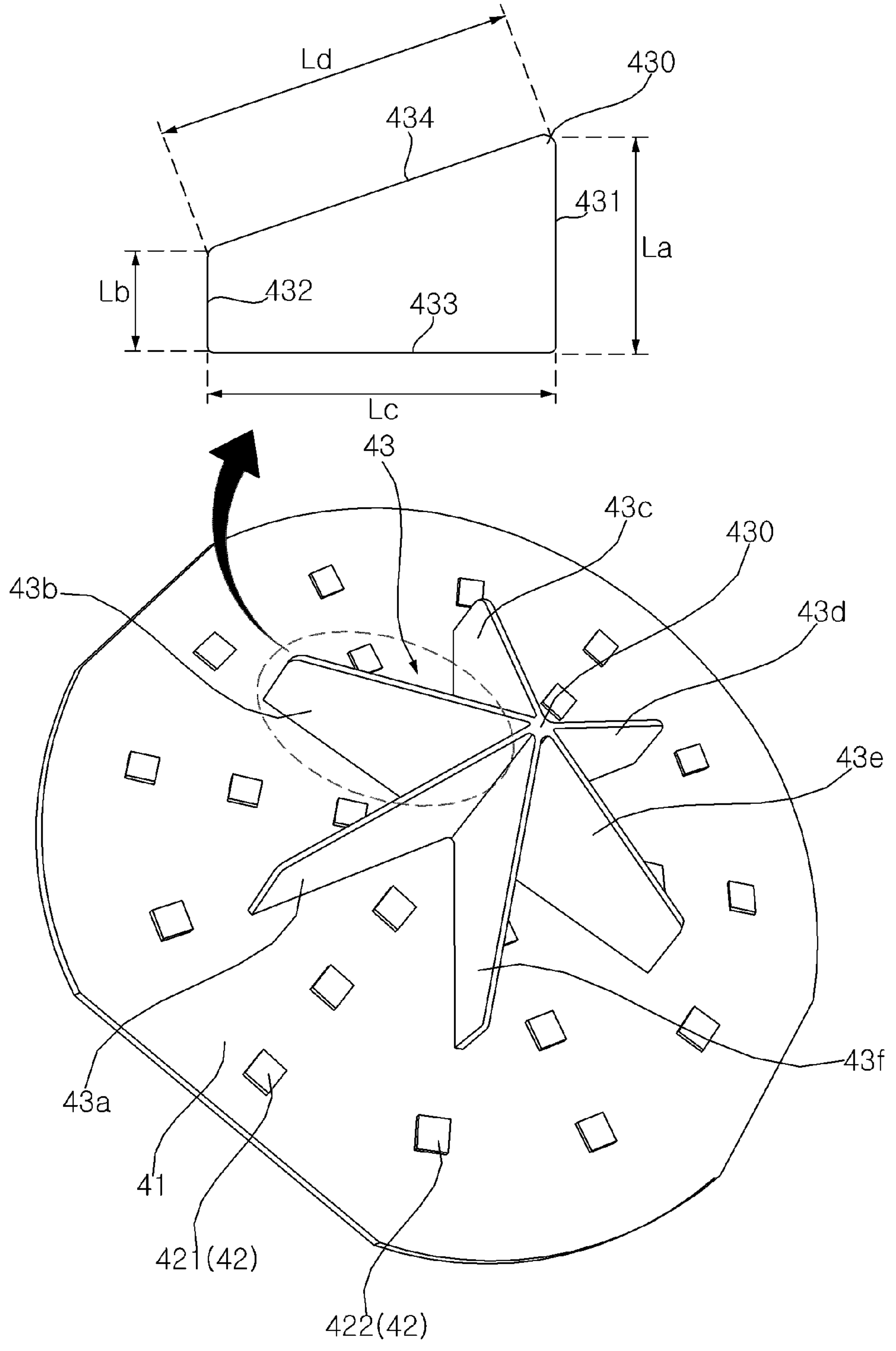

Referring to FIGS. 5 and 6, the separation plate 43 may include a plurality of separation plates 43 that extend in different directions from the center 430 of the separation plate 43. The plurality of separation plates 43 may partition a space between the substrate 41 and the diffusion plate 44 into a plurality of sub-spaces. That is, n number of separation plates 43 may divide the space between the substrate 41 and the diffusion plate 44 into n number of sub-spaces. For example, a first separation plate 43*a*, a second separation plate 43*b*, a third separation plate 43*c*, a fourth separation plate 43*d*, a fifth separation plate 43*e*, and a sixth separation plate 43*f* may divide the space between the substrate 41 and the diffusion plate 44 into six sub-spaces.

One sides of the respective separation plates 43 may be coupled to each other to thereby define the center 430 of the separation plate 43. The one sides of the respective separation plates 43 may be configured as one body. The other side of each of the separation plates 43 may be opposite the one side, and the other sides of the respective separation plates 43 may be spaced apart from each other in the circumferential direction on a horizontal plane. The length of the one side of the separation plate 43 may be greater than the length of the other side thereof in the vertical direction. For example, the separation plates 43 may have substantially the same shape.

The separation plates 43 may each have a trapezoidal shape. A first side 431 may have a lower end that defines the center 430 of the separation plate 43, and may have a first length La. A second side 432 may be opposite the first side 431, and may have a second length Lb less than the first length La. A third side 433 may be connected to an upper end of the first side 431 and an upper end of the second side 432, and may have a third length Lc greater than the first length La and the second length Lb. A fourth side 434 may be opposite the third side 433, may be connected to the lower end of the first side 431 and a lower end of the second side 432, and may have a fourth length Ld greater than the third length Lc.

Here, the third side 433 may be in contact with a lower surface of the substrate 41. The second side 432 may be spaced apart from an edge of the substrate 41 toward an inside of the substrate 41. The first side 431 and the fourth side 434 may be spaced apart from an inside of the diffusion plate 44 while being adjacent thereto. Accordingly, it is possible to reduce a decrease in light diffusion or a decrease in brightness of the contact area due to contact of the first side 431 and the fourth side 434 with the diffusion plate 44.

Meanwhile, light sources 42 may be disposed between the separation plates 43. The separation plate 43 may include a light reflective material. Accordingly, the separation plate 43 may reduce or suppress light of light sources 42 disposed in a sub-space between adjacent separation plates from being provided to other sub-spaces.

Figure 7:
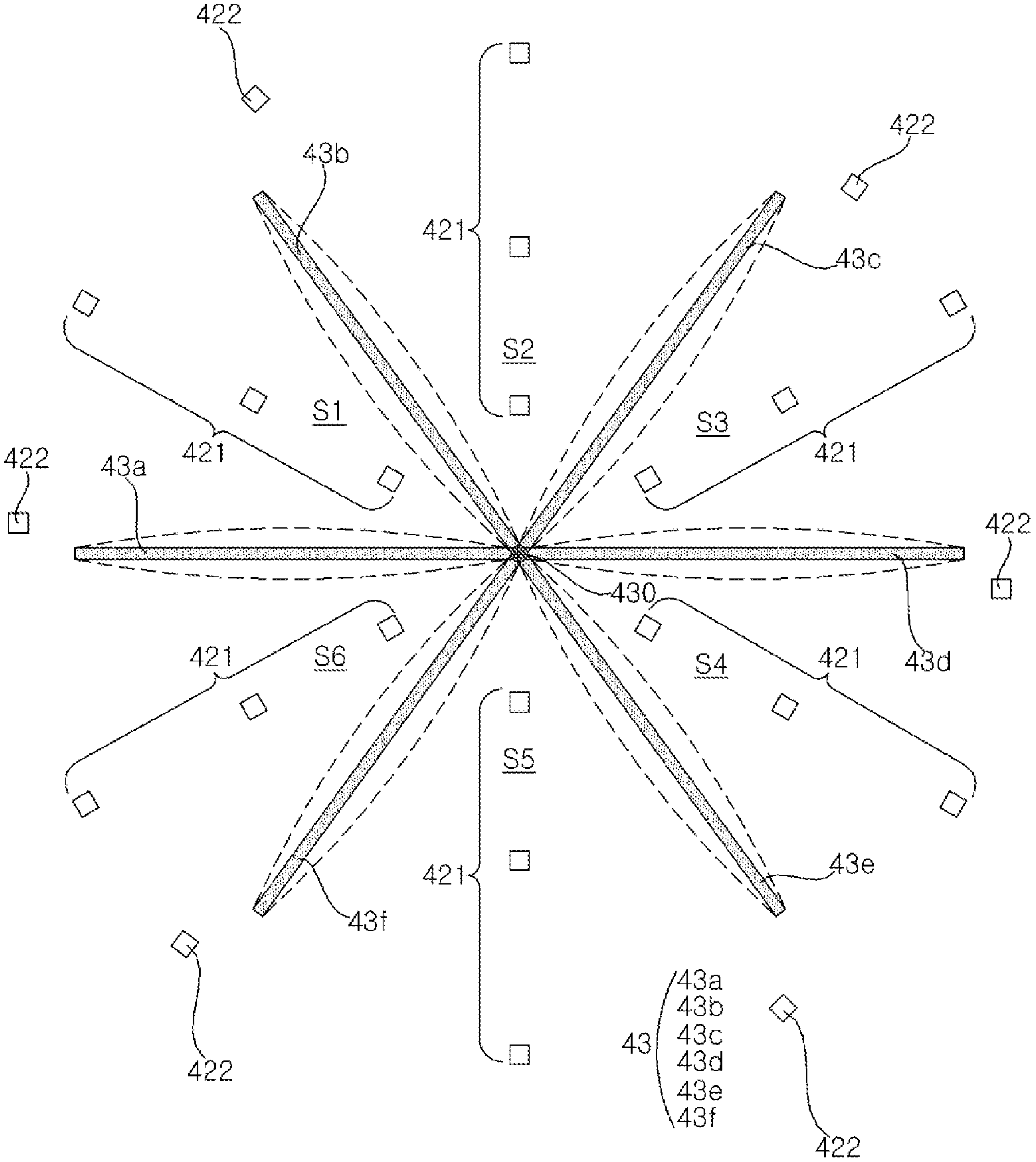

Referring to FIG. 7, the separation plates 43 may be spaced apart from one another by the same angle. For example, the first separation plate 43*a*, the second separation plate 43*b*, the third separation plate 43*c*, the fourth separation plate 43*d*, the fifth separation plate 43*e*, and the sixth separation plate 43*f* may be spaced apart from each other at intervals of 60 degrees in a circumferential direction of an imaginary circle centered at the lower end 430 of the separation plate 43.

A first sub-space S1 may be formed between the first separation plate 43*a* and the second separation plate 43*b*. A second sub-space S2 may be formed between the second separation plate 43*b* and the third separation plate 43*c*. A third sub-space S3 may be formed between the third separation plate 43*c* and the fourth separation plate 43*d*. A fourth sub-space S4 may be formed between the fourth separation plate 43*d* and the fifth separation plate 43*e*. A fifth sub-space S5 may be formed between the fifth separation plate 43*e* and the sixth separation plate 43*f*. A sixth sub-space S6 may be formed between the sixth separation plate 43*f* and the first separation plate 43*a*.

A first light source 421 may be disposed in each of the first sub-space S1, the second sub-space S2, the third sub-space S3, the fourth sub-space S4, the fifth sub-space S5, and the sixth sub-space S6. The first light source 421 may include light sources spaced apart from each other in a radial direction of an imaginary circle centered at the lower end 430 of the separation plate 43. In addition, the first light sources 421 in the respective sub-spaces S1, S2, S3, S4, S5, and S6 may be operated independently of each other. That is, the first light sources 421 disposed in the respective sub-spaces S1, S2, S3, S4, S5, and S6 may provide or emit light sequentially or in a randomly set predetermined pattern, thereby achieving various lighting effects.

For example, the first light sources 421 disposed in some of the sub-spaces S1, S2, S3, S4, S5, and S6 may emit light, but the first light sources 421 disposed in the others may not emit light. For example, the first light source 421 disposed in the first sub-space S1 may emit light, while the first light sources 421 disposed in the remaining sub-spaces S2, S3, S4, S5, and S6 may not emit light. In this case, the first separation plate 43*a* and the second separation plate 43*b* may reduce or suppress light of the first light source 421 disposed in the first sub-space S1 from being delivered to other subs-spaces including the second sub-space S2 and the sixth sub-space S6.

For example, all of the first light sources 421 disposed in the respective sub-spaces S1, S2, S3, S4, S5, and S6 may emit light. Since the separation plates 43 are spaced apart from the diffusion plate 44 (see FIG. 5), a decrease in brightness of light at the position of the separation plate 43 may be reduced.

For example, the first light source 421 disposed in one sub-space, among the sub-spaces S1, S2, S3, S4, S5, and S6 that are adjacent to each other, and the first light source 421 disposed in another sub-space may emit light of different colors. For example, the first light source 421 disposed in the first sub-space S1 and the first light source 421 disposed in the second sub-space S2 may emit light of different colors. In this case, a mixed color may appear around the second separation plate 43*b* (see the dotted line of FIG. 7).

As the first light sources 421 in the respective sub-spaces S1, S2, S3, S4, S5, and S6 are operated independently of each other, light may be projected or expressed in various manners.

Meanwhile, a second light source 422 may be spaced apart from the first light source 421, and may be disposed between a distal end of the separation plate 43 and the edge of the substrate 41. That is, the second light source 422 may be adjacent to the second side 432 (see FIG. 6) of the separation plate 43, and may be operated independently of the first light source 421. Thus, the second light source 422 may be used to supplement the brightness of light at the position of the separation plate 43, or may be used to project various mixed colors at the position of the separation plate 43.

Figure 8:
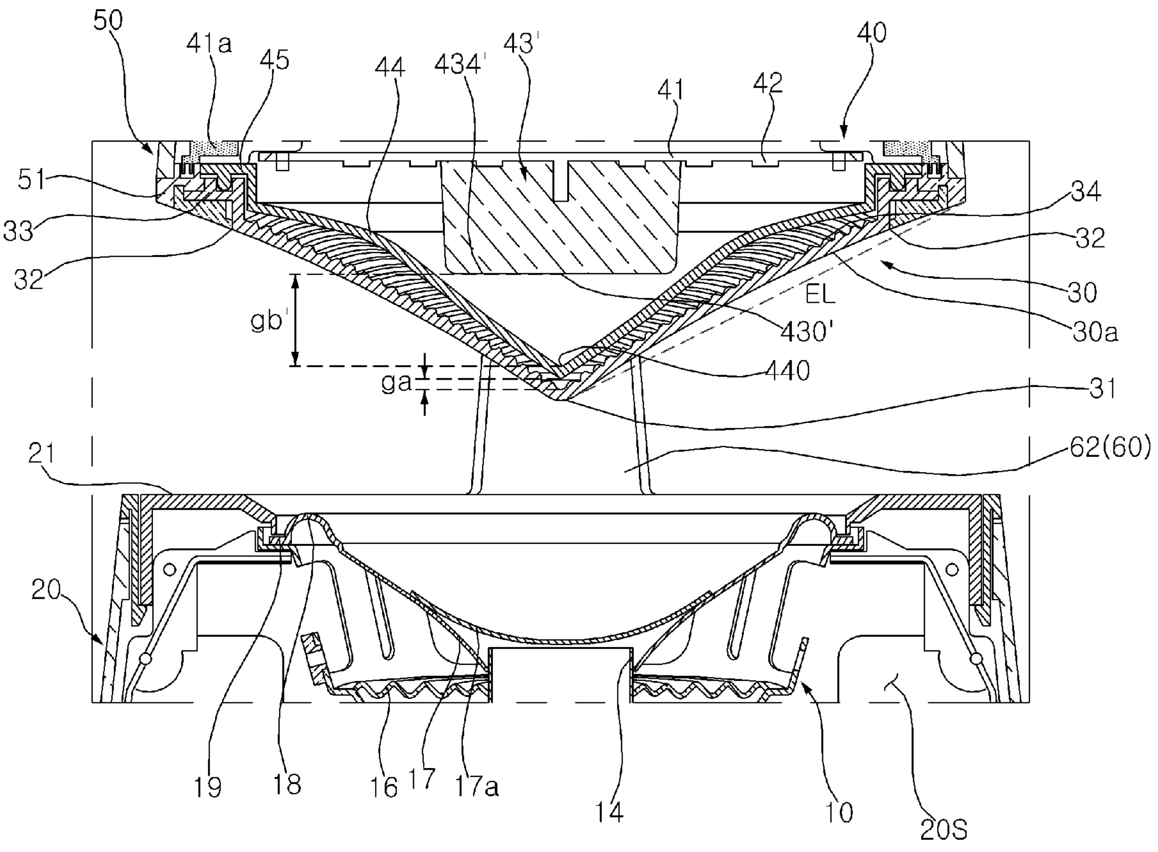
Figure 9:
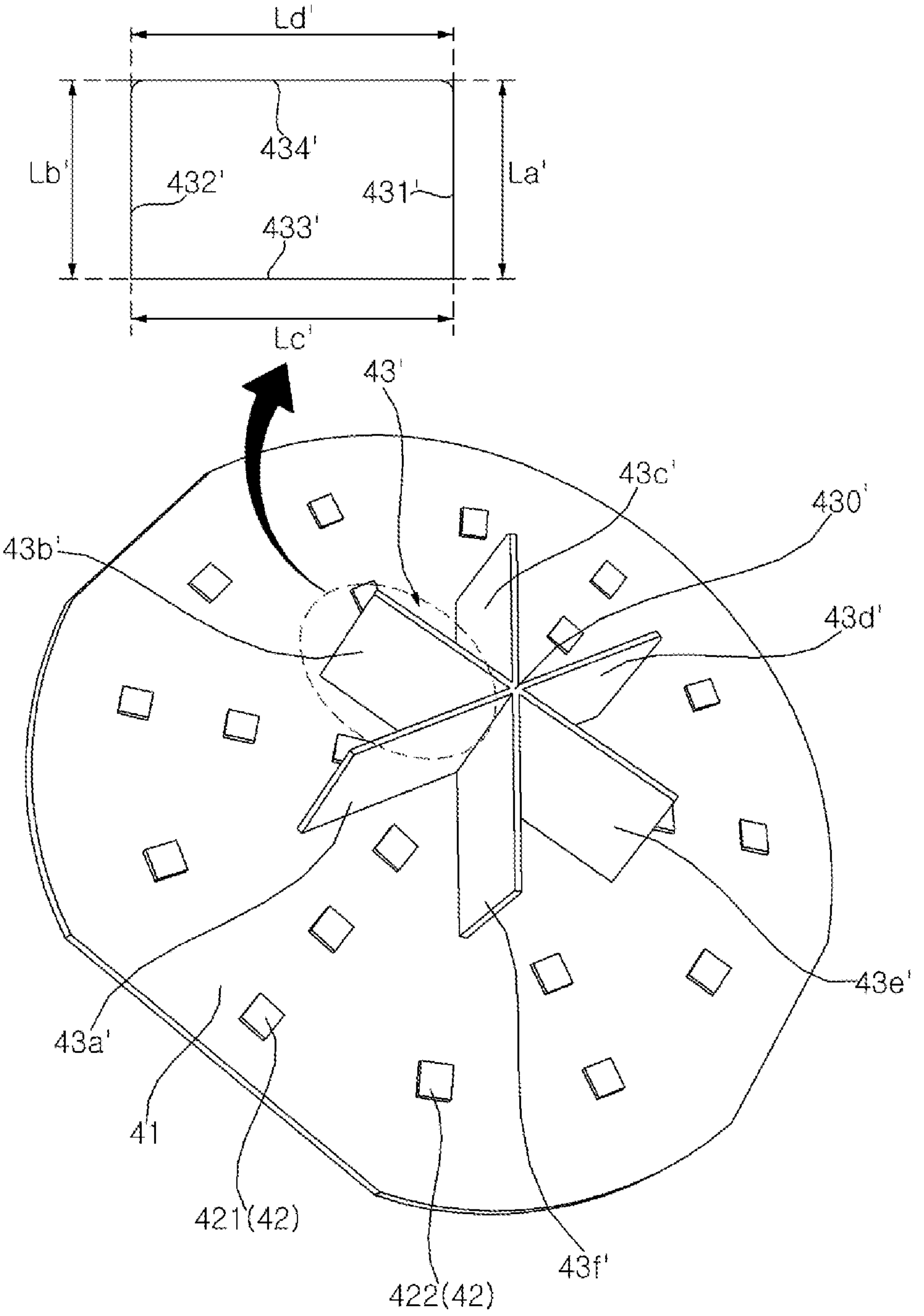

Referring to FIGS. 8 and 9, a separation plate 43' may be coupled to a bottom of the substrate 41. The separation plate 43' may be spaced apart from the light source 42 at the bottom of the substrate 41. For example, a center 430' of the separation plate 43' may be located on the vertical line VV' (see FIG. 1). In other words, the separation plate 43' and the light-transmitting plate 30 may be aligned with each other with respect to the vertical line VV'.

The separation plate 43' may include a plurality of separation plates 43' that extend in different directions from the center 430' of the separation plate 43'. The plurality of separation plates 43' may partition a space between the substrate 41 and the diffusion plate 44 into a plurality of sub-spaces. That is, m number of separation plates 43' may divide the space between the substrate 41 and the diffusion plate 44 into m number of sub-spaces. For example, a first separation plate 43*a*', a second separation plate 43*b*', a third separation plate 43*c*', a fourth separation plate 43*d*', a fifth separation plate 43*e*', and a sixth separation plate 43*f*' may divide the space between the substrate 41 and the diffusion plate 44 into six sub-spaces.

One sides of the respective separation plates 43' may be coupled to each other to thereby define the center 430' of the separation plate 43'. The other side of each of the separation plates 43' may be opposite the one side, and the other sides of the respective separation plates 43' may be spaced apart from each other in the horizontal direction. The length of the one side of the separation plate 43' may be substantially equal to the length of the other side thereof in the vertical direction. For example, the separation plates 43' may have substantially the same shape.

The separation plates 43' may each have a rectangular shape. A first side 431' may have a lower end that defines the center 430' of the separation plate 43', and may have a first length La'. A second side 432' may be opposite the first side 431', and may have a second length Lb' equal to the first length La'. A third side 433' may be connected to an upper end of the first side 431' and an upper end of the second side 432', and may have a third length Lc' greater than the first length La'. A fourth side 434' may be opposite the third side 433', may be connected to the lower end of the first side 431' and a lower end of the second side 432', and may have a fourth length Ld' equal to the third length Lc'. Here, the second length Lb' may be greater than the second length Lb (see FIG. 6), and the third length Lc' may be less than the third length Lc (see FIG. 6).

The third side 433' may be in contact with a lower surface of the substrate 41. The second side 432' may be spaced apart from an edge of the substrate 41 toward an inside of the substrate 41. The first side 431' and the fourth side 434' may be spaced apart from an inside of the diffusion plate 44.

That is, the center 440 of the diffusion plate 44 may be spaced downward from the center 430' of the separation plate 43' by a second distance gb'. Here, the second distance gb' may be greater than the second distance gb described above with reference to FIG. 5. An air gap may be formed between the substrate 41 or the separation plate 43 and the diffusion plate 44. Accordingly, light provided from the light source 42 may be more widely spread by the air gap that functions as a buffer. Further, it is possible to minimize a decrease in light diffusion or a decrease in brightness of the contact area due to contact of the first side 431' and the fourth side 434' with the diffusion plate 44.

Figure 10:
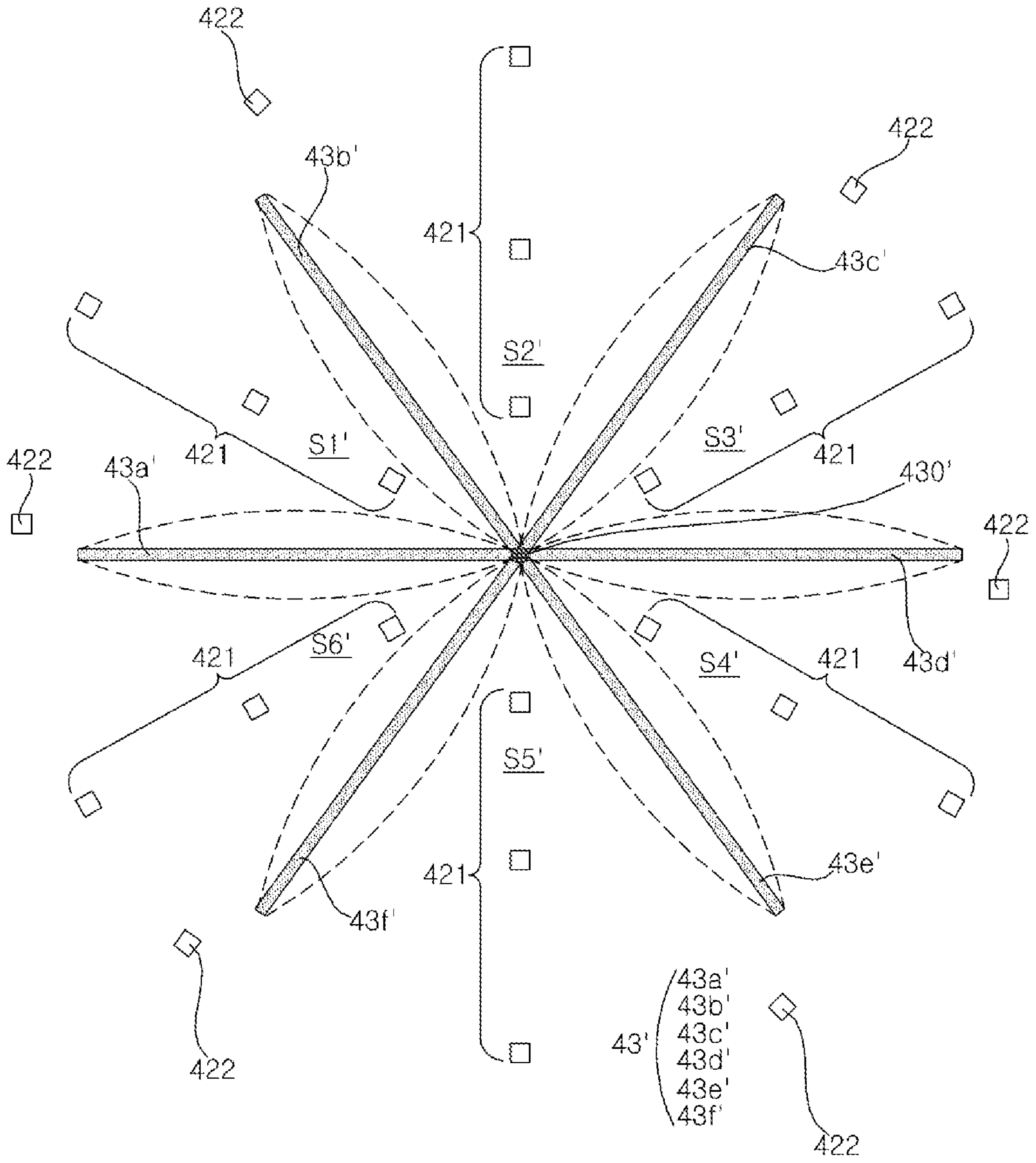

Referring to FIG. 10, the separation plates 43' may be spaced apart from one another by the same angle. For example, the first separation plate 43*a*', the second separation plate 43*b*', the third separation plate 43*c*', the fourth separation plate 43*d*', the fifth separation plate 43*e*', and the sixth separation plate 43*f*' may be spaced apart from each other at intervals of 60 degrees in a circumferential direction of an imaginary circle centered at the lower end 430' of the separation plate 43'.

A first sub-space S1' may be formed between the first separation plate 43*a*' and the second separation plate 43*b*'. A second sub-space S2' may be formed between the second separation plate 43*b*' and the third separation plate 43*c*'. A third sub-space S3' may be formed between the third separation plate 43*c*' and the fourth separation plate 43*d*'. A fourth sub-space S4' may be formed between the fourth separation plate 43*d*' and the fifth separation plate 43*e*'. A fifth sub-space S5' may be formed between the fifth separation plate 43*e*' and the sixth separation plate 43*f*'. A sixth sub-space S6' may be formed between the sixth separation plate 43*f*' and the first separation plate 43*a*'.

A first light source 421 may be disposed in each of the first sub-space S1', the second sub-space S2', the third sub-space S3', the fourth sub-space S4', the fifth sub-space S5', and the sixth sub-space S6'. The first light source 421 may include light sources spaced apart from each other in a radial direction of an imaginary circle centered at the lower end 430' of the separation plate 43'. In addition, the first light sources 421 in the respective sub-spaces S1', S2', S3', S4', S5', and S6' may be operated independently of each other. That is, the first light sources 421 disposed in the respective sub-spaces S1', S2', S3', S4', S5', and S6' may provide or emit light sequentially or in a randomly set predetermined pattern, thereby achieving various lighting effects.

For example, the first light sources 421 disposed in some of the sub-spaces S1', S2', S3', S4', S5', and S6' may emit light, but the first light sources 421 disposed in the others may not emit light. For example, the first light source 421 disposed in the first sub-space S1' may emit light, while the first light sources 421 disposed in the remaining sub-spaces S2', S3', S4', S5', and S6' may not emit light. In this case, the first separation plate 43*a* and the second separation plate 43*b* may reduce or suppress light of the first light source 421 disposed in the first sub-space S1' from being delivered to other sub-spaces including the second sub-space S2' and the sixth sub-space S6'.

For example, all of the first light sources 421 disposed in the respective sub-spaces S1', S2', S3', S4', S5', and S6' may emit light. Since the separation plates 43' are spaced apart from the diffusion plate 44 (see FIG. 8), a decrease in brightness of light at the position of the separation plate 43' may be reduced.

For example, the first light source 421 disposed in one sub-space, among the sub-spaces S1', S2', S3', S4', S5', and S6' that are adjacent to each other, and the first light source 421 disposed in another sub-space may emit light of different colors. For example, the first light source 421 disposed in the first sub-space S1' and the first light source 421 disposed in the second sub-space S2' may emit light of different colors. In this case, a mixed color may appear around the second separation plate 43*b*' (see the dotted line of FIG. 10). As the first light sources 421 in the respective sub-spaces S1', S2', S3', S4', S5', and S6' are operated independently of each other, light may be projected or expressed in various manners.

Since the distance between the separation plate 43' and the diffusion plate 44 (see FIG. 8) is greater than the distance between the separation plate 43 and the diffusion plate 44 described above with reference to FIG. 5, the mixed area (see the dotted lines of FIG. 10) around the separation plate 43' may be greater than the mixed area (see the dotted lines of FIG. 7) around the separation plate 43 described above with reference to FIG. 7.

Meanwhile, a second light source 422 may be spaced apart from the first light source 421, and may be disposed between a distal end of the separation plate 43' and the edge of the substrate 41. That is, the second light source 422 may be adjacent to the second side 432' (see FIG. 9) of the separation plate 43', and may be operated independently of the first light source 421. Thus, the second light source 422 may be used to supplement the brightness of light at the position of the separation plate 43', or may be used to project various mixed colors at the position of the separation plate 43'.

Figure 11:
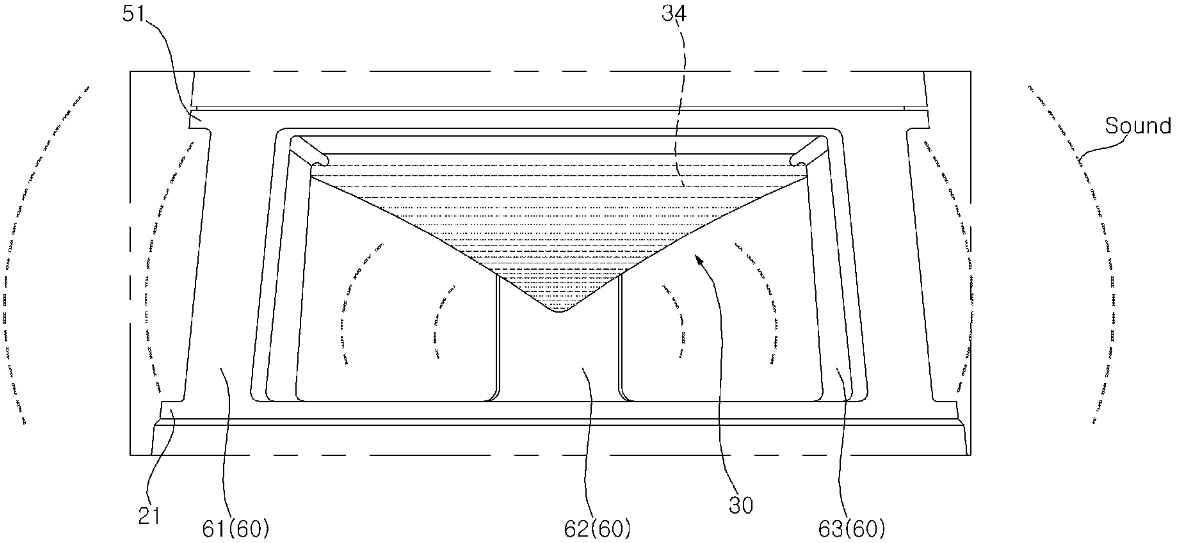

Referring to FIG. 11, a groove 34 (see FIG. 5 or FIG. 8) may be formed inside the light-transmitting plate 30. Grooves 34 may be sequentially arranged in a first direction. The groove 34 may be elongated in a second direction, which intersects the first direction, inside the light-transmitting plate 30.

For example, the grooves 34 may be sequentially arranged in the vertical direction. The groove 34 may extend while forming a circle parallel to a horizontal plane inside the light-transmitting plate 30. A center of the circle may be located on the vertical line VV' (see FIG. 1). That is, the center of a circle of the groove 34 positioned on the relatively lower side may be located below the center of a circle of the groove 34 positioned on the relatively upper side.

Accordingly, the groove 34 may allow light provided from the light source 42 through the diffusion plate 44 to the light-transmitting plate 30 to be projected as a light pattern consisting of light and shade on the surface of the light-transmitting plate 30. To correspond to the shape of the groove 34, the light pattern may be a ring-shaped stripe whose diameter increases from the lower end 31 to the upper end 32 of the light-transmitting plate 30.

Meanwhile, unlike the inner side of the light-transmitting plate 30, the surface of the light-transmitting plate 30 may be formed smooth, thereby facilitating the reflection of sound by the light-transmitting plate 30 described above.

Referring to FIGS. 1 to 11, a speaker assembly according to an aspect of the present disclosure includes: a speaker configured to provide sound in a first direction; a light-transmitting plate spaced apart from the speaker in the first direction and facing the speaker, the light-transmitting plate being configured to reflect the sound in a second direction that is different from the first direction; and an optical assembly disposed opposite the speaker with respect to the light-transmitting plate, the optical assembly being configured to provide light to the light-transmitting plate.

According to another aspect of the present disclosure, the speaker may provide the sound upward, the light-transmitting plate may cover an upper side of the speaker, and the optical assembly may be positioned above the light-transmitting plate.

According to another aspect of the present disclosure, the light-transmitting plate may be convex toward the speaker. A space between the speaker and the light-transmitting plate may be formed in all directions in a horizontal direction. The light-transmitting plate may have a center at a vertex thereof.

According to another aspect of the present disclosure, a height of the center of the light-transmitting plate with respect to a top of the speaker may be ⅔ or less of a height of an opening that is an outlet of the space.

According to another aspect of the present disclosure, the speaker assembly may further include: a first housing that defines an inner space in which the speaker is installed; and a second housing that is positioned above the first housing and surrounds an upper periphery of the light-transmitting plate. The opening may be formed between the first housing and the second housing.

According to another aspect of the present disclosure, the optical assembly may include: a substrate; a light source mounted on a surface of the substrate that faces the light-transmitting plate; and a diffusion plate that is spaced apart from the light source and is adjacent to an inside of the light-transmitting plate.

According to another aspect of the present disclosure, the speaker assembly may further include a plurality of separation plates coupled to the surface of the substrate on which the light source is mounted, the plurality of separation plates being formed of a light reflective material. A center of the plurality of separation plates may be aligned with a center of the light-transmitting plate in a vertical direction. The plurality of separation plates may extend in different directions from the center of the plurality of separation plates, so as to divide a space between the substrate and the diffusion plate into a plurality of sub-spaces. The light source may include a plurality of light sources disposed in the plurality of sub-spaces, and the plurality of light sources may be operated independently of each other.

According to another aspect of the present disclosure, the plurality of separation plates may be spaced apart from an inside of the diffusion plate. The light source may include: a first light source disposed in each of the plurality of sub-spaces; and a second light source spaced apart from the first light source, the second light source being adjacent to a distal end of the separation plate.

According to another aspect of the present disclosure, the diffusion plate may be convex toward a center of the light-transmitting plate and may be spaced apart from the inside of the light-transmitting plate.

According to another aspect of the present disclosure, the light-transmitting plate may further include grooves that extend while forming a circle parallel to a horizontal plane inside the light-transmitting plate, the grooves being sequentially arranged in a vertical direction.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the disclosure should be determined by reasonable interpretation of the appended claims, and all changes coming within the equivalency range of the disclosure are intended to be embraced in the scope of the disclosure.

The invention claimed is:

1. A speaker assembly comprising:

a speaker providing sound in a first direction;

an optical assembly providing light and spaced apart from the speaker in the first direction; and a light-transmitting plate disposed between the speaker and the optical assembly, and including a surface facing the speaker and spaced apart from the speaker in the first direction, wherein the sound from the speaker is reflected on the surface of the light-transmitting plate toward a second direction different from the first direction, and wherein the light from the optical assembly is transmitting through the surface of the light-transmitting plate.

2. The speaker assembly of claim 1, wherein the speaker provides the sound upward, wherein the light-transmitting plate covers an upper side of the speaker, and wherein the optical assembly is positioned above the light-transmitting plate.

3. The speaker assembly of claim 1, wherein the light-transmitting plate is convex toward the speaker, wherein a space between the speaker and the light-transmitting plate is formed in all directions in a horizontal direction, and wherein the light-transmitting plate has a center at a vertex thereof.

4. The speaker assembly of claim 3, wherein a height of the center of the light-transmitting plate with respect to a top of the speaker is ⅔ or less of a height of an opening that is an outlet of the space.

5. The speaker assembly of claim 4, further comprising:

a first housing defining an inner space in which the speaker is installed; and a second housing positioned above the first housing and surrounding an upper periphery of the light-transmitting plate, wherein the opening is formed between the first housing and the second housing.

6. The speaker assembly of claim 1, wherein the optical assembly comprises:

a substrate;

a light source mounted on a surface of the substrate that faces the light-transmitting plate; and a diffusion plate closer to an inside of the light-transmitting plate than the light source.

7. The speaker assembly of claim 6, further comprising a plurality of separation plates coupled to the surface of the substrate on which the light source is mounted, the plurality of separation plates being formed of a light reflective material, wherein a center of the plurality of separation plates is aligned with a center of the light-transmitting plate in a vertical direction, wherein the plurality of separation plates extends in different directions from the center of the plurality of separation plates, and divides a space between the substrate and the diffusion plate into a plurality of sub-spaces, wherein the light source comprises a plurality of light sources disposed in the plurality of sub-spaces, and wherein the plurality of light sources is operated independently of each other.

8. The speaker assembly of claim 7, wherein the plurality of separation plates are spaced apart from an inside of the diffusion plate, and wherein the light source comprises:

a first light source disposed in each of the plurality of sub-spaces; and a second light source spaced apart from the first light source, the second light source being adjacent to a distal end of the separation plate in an outside of the plurality of sub-spaces.

9. The speaker assembly of claim 6, wherein the diffusion plate is convex toward a center of the light-transmitting plate and is spaced apart from the inside of the light-transmitting plate.

10. The speaker assembly of claim 6, wherein the light-transmitting plate further comprises grooves that extend while forming a circle parallel to a horizontal plane inside the light-transmitting plate, the grooves being sequentially arranged in a vertical direction.

* * * * *